(12) United States Patent
Lee et al.

(10) Patent No.: US 11,048,949 B2
(45) Date of Patent: Jun. 29, 2021

(54) INTERACTIVE AUTONOMOUS DRIVING SYSTEM

(71) Applicants: HYUNDAI MOTOR COMPANY, Seoul (KR); KIA MOTORS CORPORATION, Seoul (KR)

(72) Inventors: Byoung Joon Lee, Suwon-si (KR); Seong Sook Ryu, Seoul (KR); Sam Yong Kim, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/801,426

(22) Filed: Feb. 26, 2020

(65) Prior Publication Data
US 2021/0049379 A1 Feb. 18, 2021

(30) Foreign Application Priority Data
Aug. 12, 2019 (KR) ........................ 10-2019-0098230

(51) Int. Cl.
| | |
|---|---|
| G06K 9/00 | (2006.01) |
| B60W 30/18 | (2012.01) |
| B60W 50/16 | (2020.01) |
| G06D 1/02 | (2006.01) |
| G06N 20/00 | (2019.01) |
| G06F 3/0488 | (2013.01) |
| B60W 50/00 | (2006.01) |
| G05D 1/02 | (2020.01) |

(52) U.S. Cl.
CPC ... *G06K 9/00805* (2013.01); *B60W 30/18163* (2013.01); *B60W 50/16* (2013.01); *G05D 1/0238* (2013.01); *G06F 3/0488* (2013.01); *G06K 9/00798* (2013.01); *G06N 20/00* (2019.01); *B60W 2050/0008* (2013.01); *B60W 2050/0064* (2013.01); *B60W 2554/4041* (2020.02); *G06K 2207/1012* (2013.01)

(58) Field of Classification Search
CPC .......... G06K 9/00805; G06K 9/00798; G06K 2207/1012; B60W 50/16; B60W 30/18163; B60W 2050/0008; B60W 2050/0064; B60W 2554/4041; G06F 3/0488; G06N 20/00; G05D 1/0238
USPC ....................................................... 348/148
See application file for complete search history.

(56) References Cited

U.S. PATENT DOCUMENTS

| | | | | |
|---|---|---|---|---|
| 9,047,778 B1 * | 6/2015 | Cazanas | ................. | G08G 1/166 |
| 2006/0026521 A1 * | 2/2006 | Hotelling | .............. | G06F 3/0488 |
| | | | | 715/702 |

(Continued)

*Primary Examiner* — Marnie A Matt
(74) *Attorney, Agent, or Firm* — Brinks Gilson & Lione

(57) ABSTRACT

An interactive autonomous driving system for an autonomous driving vehicle may include: a target mapping device that determines whether an obstacle is present in a predetermined range of a target selected by a passenger and outputting obstacle information; a target attribute determination device that determines a target attribute based on the obstacle information and outputs target controllable item information; and a processor that generates control mode recommendation information selectable by the passenger based on the target controllable item information and outputs target attribute information and a selected control mode when control mode selection information is received from the passenger.

19 Claims, 11 Drawing Sheets

(56) References Cited

U.S. PATENT DOCUMENTS

| | | | | |
|---|---|---|---|---|
| 2007/0061053 | A1* | 3/2007 | Zeitzew | G06F 8/36 |
| | | | | 701/1 |
| 2009/0174573 | A1* | 7/2009 | Smith | G08G 1/166 |
| | | | | 340/905 |
| 2010/0207787 | A1* | 8/2010 | Catten | G08G 1/096716 |
| | | | | 340/905 |
| 2012/0083960 | A1* | 4/2012 | Zhu | G05D 1/0276 |
| | | | | 701/23 |
| 2014/0371954 | A1* | 12/2014 | Lee | G06F 3/0488 |
| | | | | 701/2 |
| 2015/0187214 | A1* | 7/2015 | Ichikawa | G08G 1/166 |
| | | | | 348/118 |
| 2016/0171314 | A1* | 6/2016 | Shao | G06K 9/342 |
| | | | | 382/104 |
| 2016/0347310 | A1* | 12/2016 | Moran | G08G 1/16 |
| 2017/0228126 | A1* | 8/2017 | Kim | G06F 3/0488 |
| 2017/0248949 | A1* | 8/2017 | Moran | G08G 1/165 |
| 2017/0248950 | A1* | 8/2017 | Moran | G05D 1/0055 |

* cited by examiner

INTERACTIVE AUTONOMOUS DRIVING SYSTEM

CROSS-REFERENCE TO RELATED APPLICATION

This application claims priority to and the benefit of Korean Patent Application No. 10-2019-0098230, filed on Aug. 12, 2019, the entire contents of which are incorporated herein by reference.

FIELD

The present disclosure relates to an interactive autonomous driving system, and in particular, a technique for changing an autonomous driving mode in an autonomous driving vehicle.

BACKGROUND

The statements in this section merely provide background information related to the present disclosure and may not constitute prior art.

With the development of automobile industry, autonomous driving systems or driving assistance systems capable of providing convenience to drivers have been continuously developed. The above-described autonomous driving system may recognize a surrounding vehicle or an obstacle through a sensor and provide a driver with various convenience functions such as a lane keeping function, a speed keeping function, a forward vehicle following function, a lane change function, and the like.

Autonomous driving sensors or systems of current technology have limitation in recognizing and avoiding or following unrecognizable obstacles (unusual shape, low-height animals, fallen luggage, or the like), unrecognizable road surfaces (manholes, hollow ground, potholes, or the like), unstable obstacles (big vehicles such as trucks/buses, or reckless driving vehicles).

When a driver uses the autonomous driving system for a certain period of time, the driver may notice such limitations to the autonomous driving sensors and control and may be anxious about the failure of the autonomous driving due to the limitations. In addition, the driver may experience inconvenience from switching to the autonomous driving to the manual operation (i.e., operating a steering wheel and pedals of the vehicle) to avoid the driving risk when the failure of autonomous driving control is expected. In this case, to switch back to an autonomous driving mode, the driver needs to perform re-operation.

However, this avoidance method may be operated only by one driver located in a driver's seat among passengers.

SUMMARY

The present disclosure has been made to solve the above-mentioned problems occurring in the prior art while advantages achieved by the prior art are maintained intact.

The present disclosure allows any passenger in a vehicle to present correction to front and/or surrounding information to a system by operating a simple touch screen when situation limiting the autonomous driving sensor and the control occurs.

In addition, forms of the present disclosure make it possible to present the correction information to an autonomous driving system by utilizing not only an in-vehicle device but also the passenger's personal device.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an interactive autonomous driving system includes: a target mapping device that determines whether an obstacle is present in a predetermined range of a target selected by a passenger and outputting obstacle information; a target attribute determination device that determines a target attribute based on the obstacle information and outputs target controllable item information; and a processor that generates control mode recommendation information selectable by the passenger based on the target controllable item information and outputs target attribute information and a selected control mode when control mode selection information is received from the passenger.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
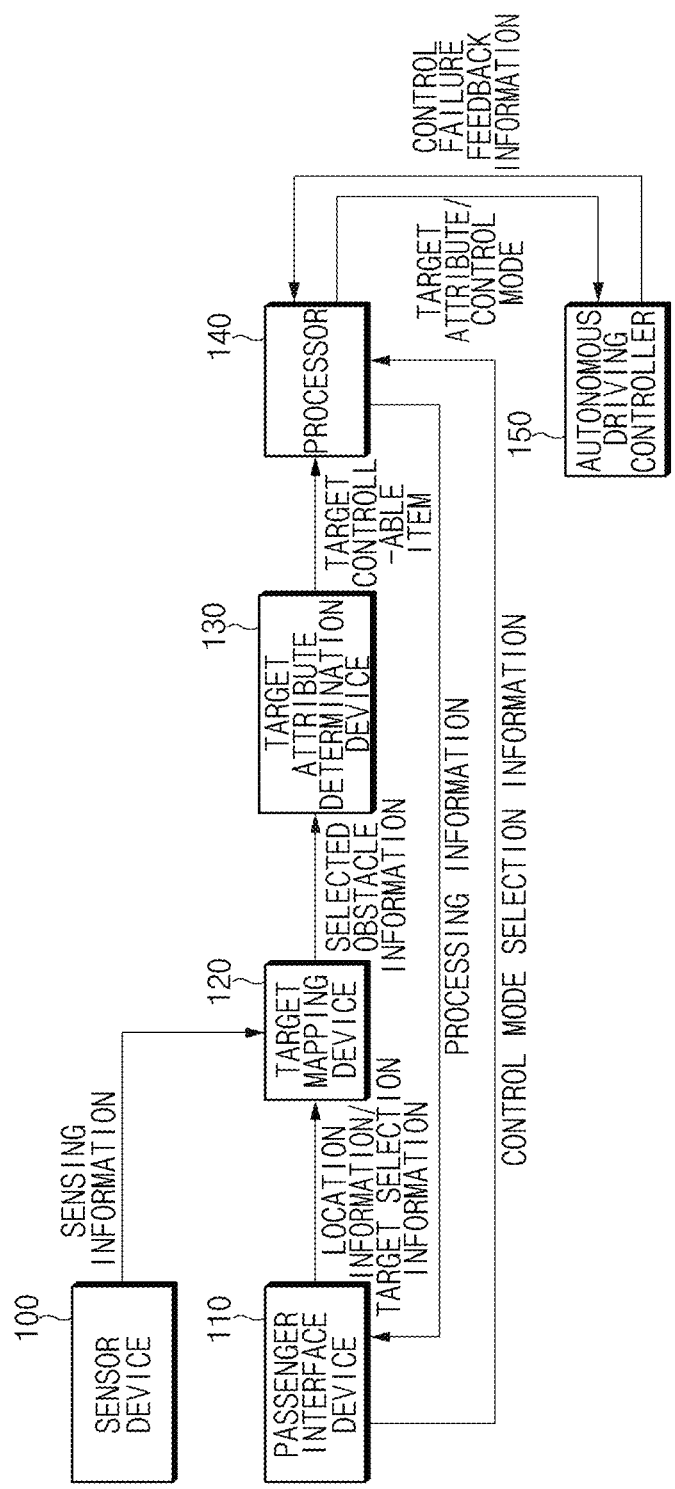
FIG. 1 is a configuration diagram of an interactive autonomous driving system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, in describing the exemplary forms of the present disclosure, a detailed description of well-known features or functions will be ruled out in order not to unnecessarily obscure the gist of the present disclosure.

FIG. 1 is a configuration diagram of an interactive autonomous driving system according to one form of the present disclosure.

Referring to FIG. 1, an interactive autonomous driving system may include a sensor device 100, a passenger interface device 110, a target mapping device 120, a target attribute determination device 130, a processor 140, and an autonomous driving controller 150.

Here, the sensor device 100 may include a plurality of sensors to sense information about a lane, an obstacle, a surrounding environment, and the like. Sensing information sensed by the sensor device 100 is transmitted to the target mapping device 120.

In addition, the passenger interface device 110 may receive correction information from a passenger through a touch on a screen or the like. The passenger interface device 110 may first receive initial position information and target selection information from a passenger, and subsequently receive control mode selection information.

A screen of surroundings of a vehicle (host vehicle) is displayed on a display screen of the passenger interface device 110 during autonomous driving. The passenger may select a target which the passenger wants to avoid and/or follow on the display screen.

Here, the passenger interface device 110 may receive target selection information using a touch screen or the like. In this case, the passenger may touch the touch screen to remove dust or the like, in addition to inputting the target selection information. In this case, the passenger interface device 110 may determine the input of the target selection information by recognizing a specific situation to prevent misrecognition.

For example, the passenger interface device 110 may recognize a point which is continuously touched on the target of the touch screen for a predetermined time (for example, 1 second) or more. As another example, when it needs to be distinguished from the use of a touch function of another screen, a point which is double touched may be recognized.

The passenger interface device 110 may transmit the initial position information and the target selection information which are input from the passenger to the target mapping device 120. The passenger interface device 110 may transmit control mode selection information to the processor 140.

The passenger interface device 110 may receive processing information from the processor 140 and display the processing information to allow the passenger to recognize the processing information. The passenger may refer to the processing information displayed on the passenger interface device 110 in selecting the control mode selection information. In this case, the processing information may include control mode recommendation information selectable by the passenger, negative feedback information, control failure feedback information, and the like.

For example, when the passenger has inputted target selection information through the screen of the passenger interface device 110, the passenger may touch and select desired control mode selection information after lifting a finger. As another example, the passenger may select the desired control mode selection information by touching and sliding the screen after inputting the target selection information through the screen of the passenger interface device 110. As another example, the passenger may input the target selection information and the control mode selection information at a time or continuously without waiting for the input of processing information for quick operation.

According to another form, it is also possible to present the correction information to the autonomous driving system by utilizing not only a device in the vehicle but also a device possessed by the passenger (e.g., a dedicated app for a smartphone). In this case, the passenger interface device 110 may be implemented with a smartphone or the like possessed by the passenger.

According to another form, it is possible for all passengers in the vehicle, as well as the driver, to input the correction information according to a position of an input device or display which the passenger uses to input the correction information.

In addition, the target mapping device 120 may receive sensing information from the sensor device 100. The target mapping device 120 may receive initial position information and target selection information from the passenger interface device 110. The target mapping device 120 may recognize an obstacle mapped to the target based on the sensing information, the initial position information, and the target selection information, and output the selected obstacle information to the target attribute determination device 130.

The target mapping device 120 may determine whether there is an obstacle recognized from the sensor device 100 within a predetermined range around a target point. When there is a recognized obstacle, the target mapping device 120 may output boundary information of an obstacle mapped to a selected target. On the other hand, when there is no recognized obstacle, the target mapping device 120 may re-recognize an obstacle within a predetermined range around the selected target or recognize a road surface (manholes, potholes, hollow ground, or the like).

Here, the target mapping device 120 may re-recognize the obstacle in the following manner. For example, the target mapping device 120 may increase a recognition rate by lowering a determination threshold for recognizing an obstacle. As another example, the target mapping device 120 may newly recognize obstacles mapped to the target and output boundary information by using separate complementary recognition algorithms (i.e., a set of instructions).

The target mapping device 120 may include an obstacle pattern recognizer capable of performing machine learning as a basic obstacle recognizer. The complementary algorithm of the target mapping device 120 may use an edge-based detector or other algorithms.

Although the target mapping device 120 has performed the re-recognition process, when there is no recognized obstacle, the target mapping device 120 may output an indicator indicating that a target to be controlled is not recognized as the obstacle.

The target attribute determination device 130 may receive the selected obstacle information from the target mapping device 120 to determine a target attribute. The target attribute determination device 130 may output target controllable item information to the processor 140.

The target attribute determination device 130 may classify the type of the obstacle information selected by the target mapping device 120 as follows. For example, the target attribute determination device 130 may determine whether the obstacle is a three-dimensional object such as a vehicle or an obstacle on a road surface such as a manhole.

The target attribute determination device 130 may determine a next target attribute based on obstacle information received from the target mapping device 120. That is, the target attribute determination device 130 may determine a road type of the target attribute. For example, it is determined whether the lane of the selected target is on a curved road or on a straight road. The target attribute determination device 130 may determine whether a selected obstacle is on a host vehicle's lane or an adjacent left or right lane or a vehicle that is cutting in or is being followed.

The target attribute determination device 130 may classify an attribute of the target selected by the passenger by considering all the above information as in the following examples. For example, the target attribute determination device 130 may classify attributes into a followed vehicle on a host vehicle's lane on a curved road, a followed/nonfollowed vehicle on a host vehicle's adjacent lane on a curved road, a vehicle being cutting-in on a host vehicle's lane on a straight/curved road, a followed vehicle on a host vehicle's lane on a straight road, a vehicle on a host vehicle's adjacent lane on a straight road, and a road obstacle on a straight road.

The processor 140 may generate processing information corresponding to the target controllable item information applied by the target attribute determination device 130 and the control mode selection information applied by the passenger interface device 110. In addition, the processor 140 may output the target attribute information and the control mode information to the autonomous driving controller 150.

The processor 140 may output predefined control mode recommendation information to the passenger interface device 110 based on the target attribute determined by the target attribute determination device 130 as shown in Table 1 below.

adjacent lane. Control target selection background "F" may represent a case in which a passenger selects a target in advance when a sudden braking is expected due to the late selection of a following target during cut-in.

Control target selection background "G" may represent a case in which a passenger instructs a host vehicle to overtake a front vehicle which is cutting in with a simple input. Control target selection background "H" may represent a case in which a passenger adjusts a set distance during control for following a front vehicle with a simple input.

Control target selection background "I" may represent a case in which a passenger instructs a host vehicle to overtake a front vehicle with a simple input. Control target selection background "J" may represent a case in which a passenger instructs a host vehicle to be away from a vehicle that is unstable for the host vehicle to drive side by side.

Control target selection background "K" may represent a case in which a passenger identifies a road obstacle that is

TABLE 1

| Target attribute example | | | | Target-adapted | Control |
|---|---|---|---|---|---|
| Obstacle type | Road type | Obstacle location | Whether following is performed | control mode (Pre-defined) example | Target selection background |
| Vehicle | Curved road | Host vehicle's lane | x | Following target selection | A |
| | | | o | Relative distance adjustment (decrease/increase) | B |
| | | | o | Overtaking(left/right) | C |
| Vehicle | Curved road | Host vehicle's adjacent lane | o | Following target release | D |
| | | | Don's care | Lane placement (left/right) | E |
| Vehicle | — | Cut-in | x | Following target selection | F |
| | | | — | Overtaking(left/right) | G |
| Vehicle | Straight road | Host vehicle's lane | o | Relative distance adjustment (decrease/increase) | H |
| | | | o | Overtaking (left/right) | I |
| Vehicle | Straight road | Host vehicle's adjacent lane | — | Lane placement (left/right) | J |
| Road obstacle | — | Host vehicle's adjacent lane | — | Avoidance (left/right) | K |
| | | | — | Drive slowly | L |

Referring to Table 1 above, control target selection background "A" may represent a case in which a passenger reselects a target when rapid acceleration is expected due to missing a front target on a curved road during forward following control. Control target selection background "B" may represent a case in which a passenger adjusts a set distance for front-vehicle following control with a simple input.

Control target selection background "C" may represent a case in which a passenger instructs a host vehicle to overtake a front vehicle with a simple input. Control target selection background "D" may represent a case in which a passenger releases a target when an adjacent lane is misidentified as a front vehicle on a curved road.

Control target selection background "E" may represent a case in which a passenger instructs a host vehicle to be away from a vehicle that is unsafe for a host vehicle to drive side by side (e.g., a truck, a bus, a violent vehicle, a drowsy driving vehicle, or like). In this case, a lane placement control mode may refer to a mode of controlling a host vehicle to pass with an offset to be away from a vehicle in a transverse direction when passing by the vehicle in an difficult to be recognized by the sensor (e.g., manholes, hollow ground, potholes, or the like) and instructs a host vehicle to avoid the obstacle. Control target selection background "L" may represent a case in which a passenger instructs a host vehicle to drive slowly when it is difficult to avoid a road obstacle.

The processor 140 may receive a target mapping obstacle boundary indication determined by the target mapping device 120, a touch sound, and a vibration driving command through the target attribute determination device 130, and output the same to the passenger interface device 110 as processing information.

There is no target mapping obstacle at a location selected by the passenger, or there may be a case where none corresponds to the predefined target attributes defined as shown in [Table 1] above. In this case, the processor 140 may not output the obstacle boundary indication, the touch sound, or the vibration driving command, or may separately classify such a case and output the same as negative feedback information. The processor 140 may output the negative feedback information indicating that control is hard when a control mode that is not capable of being supported is input from the passenger interface device 110.

In addition, when the processor 140 recognizes a center lane, a shoulder, a guard rail, an obstacle, or the like is recognized on the left or right side of a host vehicle's lane as a non-driving path during the control mode, the processor 140 may not output the non-driving path as control mode recommendation information and may deactivate the non-driving path.

The autonomous driving controller 150 performs the temporary control mission during autonomous driving according to the target attribute information determined by the target attribute determination device 130 and transmitted to the processor 140 and the control mode information selected by the passenger. The autonomous driving controller 150 may output control failure feedback information to the processor 140 when a control mission fails. Then, the processor 140 may output processing information on the control failure to the passenger interface device 110 to allow the failure and cause to be displayed.

As described above, in the exemplary form of the present disclosure, when the passenger determines that it is difficult for the sensor device 100 to perform recognition during autonomous driving of the vehicle and inputs an expected position of the target, the target mapping device 120 may detect the type and exact position of an obstacle actually existing at a corresponding location. Then, the target attribute determination device 130 may determine a target attribute by considering surrounding environment information together, and recommend an avoidance or following control mode which the autonomous driving system is able to provide with respect to a target. Then, the control mode recommendation information is transmitted to the passenger interface device 110 through the processor 140. When the passenger finally selects a control mode through the passenger interface device 110, the autonomous driving controller 150 may perform corresponding control.

Figure 2A:
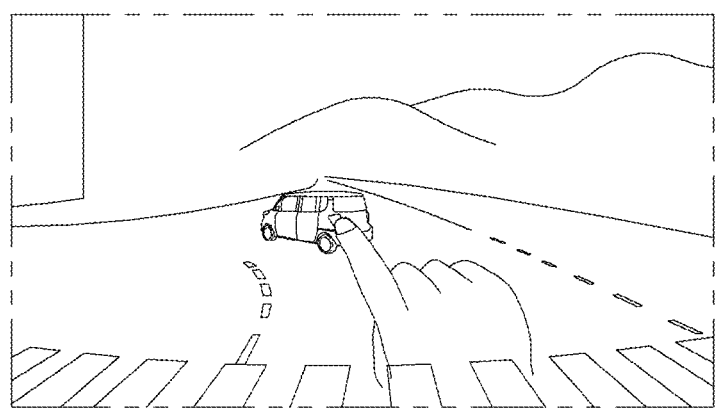
FIGS. 2A to 2C illustrate input examples of a screen displayed on a passenger interface device of FIG. 1.
Figure 2B:
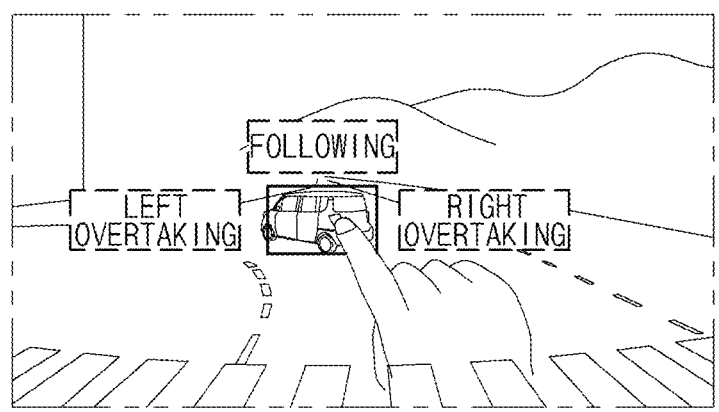
Figure 2C:
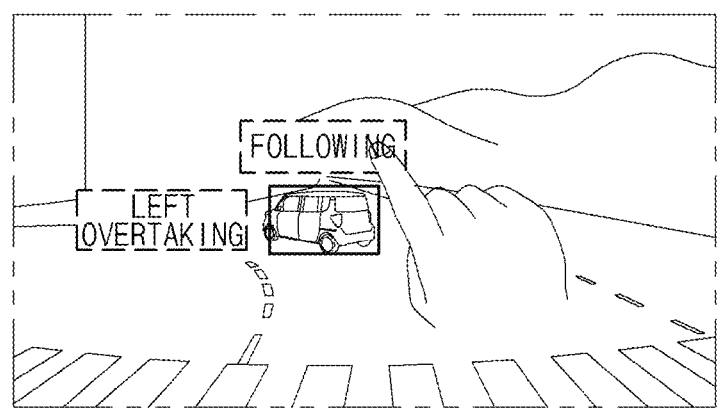

FIGS. 2A to 2C are diagrams illustrating input examples of a screen displayed on the passenger interface device 110 of FIG. 1. FIGS. 2A to 2C illustrate input examples of a screen indicating a situation in which a vehicle is cutting in on a host vehicle's lane.

FIG. 2A illustrates a screen in which a passenger selects a target. In this case, the passenger may touch a target vehicle on a screen of the passenger interface device 110 or select a target using a separate manipulation system. As another example, the passenger may select a target by performing a long touch or a double touch on the target vehicle on the screen of the passenger interface device 110.

FIG. 2B illustrates a case in which target boundary information and target-adapted control mode information are displayed on the screen of the passenger interface device 110. In FIG. 2B and the following drawings, the solid line indicates boundary information of a target mapping obstacle, and the dotted line indicates target-adapted control mode information.

In FIG. 2B, the target-adapted control mode displayed on the screen of the passenger interface device 110 may include modes such as "a left overtaking mode", "a following mode" and "a right overtaking mode".

FIG. 2C illustrates a case in which a passenger selects a desired control mode (e.g., the following mode) on the screen of the passenger interface device 110. For example, when a passenger wants to select a control mode, the passenger may lift his/her finger from the target and touch a desired control mode or slide his/her finger to the desired control mode from the target.

Figure 3A:
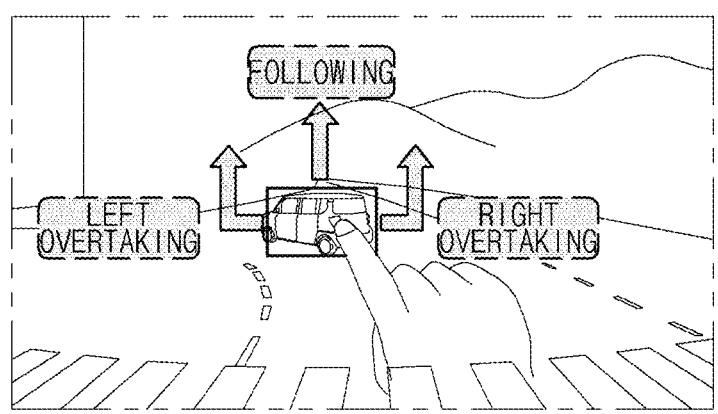
FIGS. 3A and 3B illustrate examples in which a target-adapted control mode is displayed on a passenger interface device of FIG. 1.
Figure 3B:
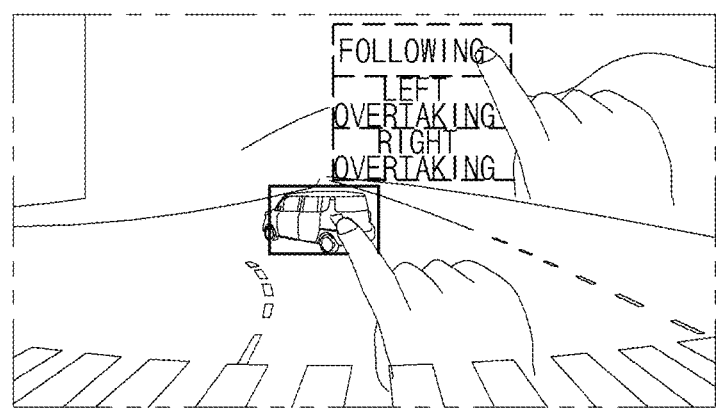

FIGS. 3A and 3B are diagrams illustrating examples in which a target-adapted control mode is displayed in the passenger interface device 110 of FIG. 1. FIGS. 3A and 3B merely illustrate examples and an image may be expressed in the top view for improvement of intuition.

Referring to FIGS. 3A and 3B, when the processor 140 transmits control mode recommendation information that the passenger is able to select to the passenger interface device 110, the target-adapted control mode may be displayed on the passenger interface device 110.

Referring to FIG. 3A, a target boundary may be displayed on the screen of the passenger interface device 110 as indicated by the solid line, and a target-adapted control mode such as a "left overtaking mode", a "following mode", or a "right overtaking mode" may be displayed as indicated by the dotted line.

FIG. 3B illustrates an example in which the passenger lifts her/his finger from a target displayed on the screen of the passenger interface device 110 and then touches a desired control mode (e.g., the following mode).

FIGS. 4 to 8 illustrate examples of screen input according to a control mode.

Figure 4:
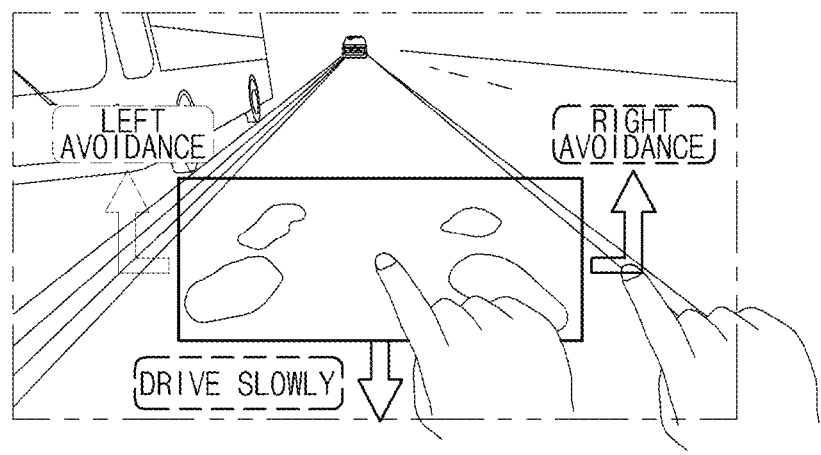
FIGS. 4 to 8 illustrate examples of screen input according to a control mode.

FIG. 4 illustrates one form in which a mode for avoiding a pothole by turning to the right on the screen of the passenger interface device 110. In this case, the "left avoidance mode" may be deactivated due to recognition of a center lane or an obstacle.

Figure 5:
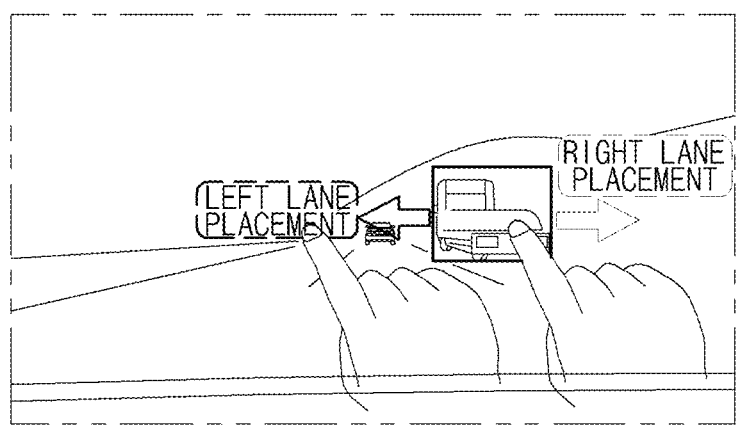

FIG. 5 illustrates one form of selecting a lane placement mode in which a host vehicle moves to the left of an adjacent lane of an unstable vehicle on the screen of the passenger interface device 110. In this case, the target is a vehicle on an adjacent right lane, the "right lane placement mode" may be deactivated.

Figure 6:
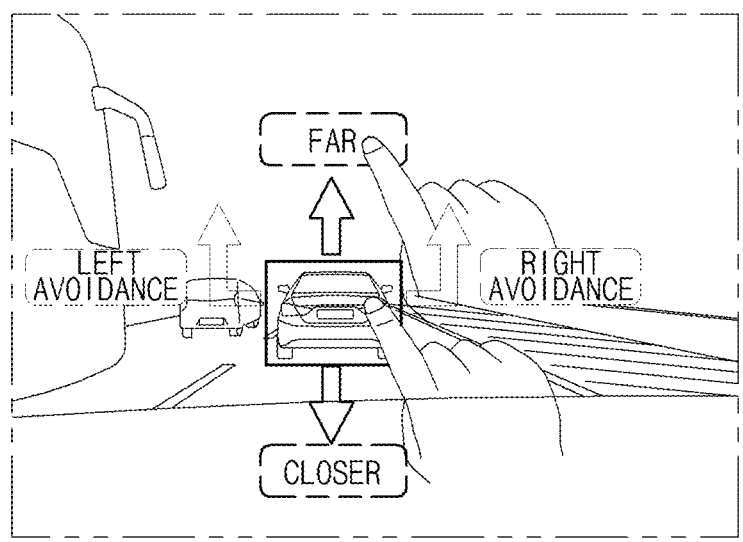
Figure 7:
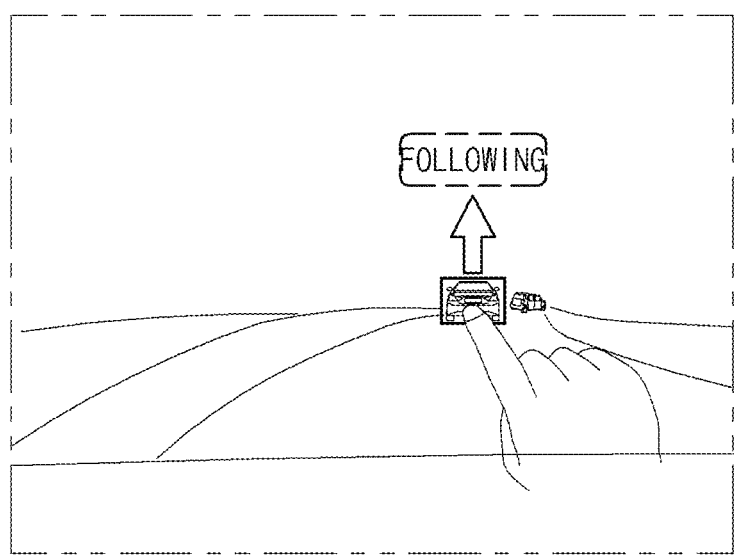

FIG. 6 illustrates one form of selecting a mode for increasing a set distance to a followed vehicle on a host vehicle's lane on the screen of the passenger interface device 110. In this case, the "left avoidance mode" and the "right avoidance mode" may be deactivated due to recognition of obstacles and yellow lanes FIG. 7 illustrates one form of resetting a target upon acceleration due to missing of a following target on a curved lane on the screen of the passenger interface device 110. In this case, a target is a vehicle which is not followed, and therefore, the "overtaking" and "distance adjustment" modes may not be displayed.

Figure 8:
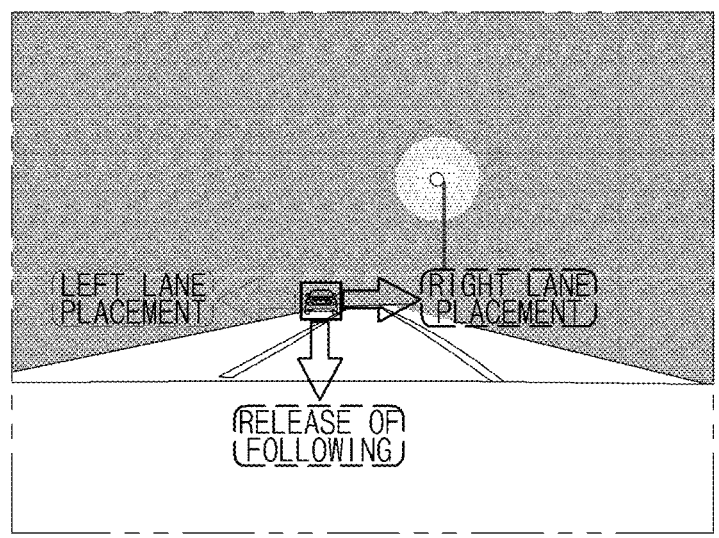

FIG. 8 illustrates one form of selecting a mode for releasing a following target on the screen of the passenger interface device 110 when a target on an adjacent lane is misidentified as the following target on a curved road. In this case, the target is a vehicle on an adjacent left lane, and therefore, the "left lane placement" mode may be deactivated.

As described above, the exemplary forms of the present disclosure may allow any passenger in the vehicle to avoid or follow a situation caused by limitation of a sensor of the autonomous driving system through a simple auxiliary input on the screen. Accordingly, it is possible to solve the inconvenience and anxiety of the passenger and at the same time, make the passenger feel fun like playing games by inducing passenger participation in the autonomous driving function.

In addition, in one form of the present disclosure, the autonomous driving system may check and determine the situation of the target selected by the passenger (an obstacle type, a road type, an obstacle location, whether following is performed, other surrounding obstacles, or the like) through the sensor. Accordingly, a simple and intuitive command input is possible by selectively presenting to the passenger only a customized control mode that may be supported by the system for the target In addition, the exemplary form of the present disclosure enables the input of correction information to the autonomous driving system by utilizing not only the in-vehicle device but also the device possessed by the passenger. Therefore, even when there is no passenger in the driver's seat, it is possible to respond to the emergency situation during autonomous driving.

As those skilled in the art to which the present disclosure pertains may implement the present disclosure in other specific forms without changing the technical spirit or main features, the forms described above should be understood as illustrative and not restrictive in all aspects. The scope of the present disclosure is shown by the following claims rather than the detailed description, and all changes or modifications derived from the meaning and scope of the claims and their equivalents should be construed as being included in the scope of the present disclosure.

According to the forms of the present disclosure, it is possible to avoid or follow a limit situation while maintaining an autonomous driving state by allowing the system to re-determine obstacles, road information, or the like based on information presented from a certain passenger in the vehicle.

In addition, the forms of the present disclosure are intended to illustrate that various modifications, changes, replacements and additions will be possible to those skilled in the art through the spirit and scope of the appended claims, such modifications and changes should belong to the following claims.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An interactive autonomous driving system, comprising:
   a target mapping device configured to determine whether an obstacle is present in a predetermined range of a target selected by a passenger and output obstacle information;
   a target attribute determination device configured to determine a target attribute based on the obstacle information and output target controllable item information; and
   a processor configured to generate control mode recommendation information selectable by the passenger based on the target controllable item information and output target attribute information and a selected control mode when control mode selection information is received from the passenger,
   wherein the target mapping device is configured to re-recognize the obstacle by increasing a recognition rate and by lowering a determination threshold for recognizing the obstacle.

2. The interactive autonomous driving system of claim 1, wherein the target mapping device is configured to:
   output boundary information of an obstacle mapped to the selected target when the obstacle is present and
   re-recognize the obstacle or recognize a road surface within a predetermined range of the selected target when no obstacle is present.

3. The interactive autonomous driving system of claim 1, wherein the target mapping device is configured to output an indication that a target to be controlled has not been recognized as the obstacle when there is no obstacle recognized in re-recognizing the obstacle.

4. The interactive autonomous driving system of claim 1, wherein the target mapping device is configured to utilize a machine learning-based pattern recognizer to recognize the obstacle.

5. The interactive autonomous driving system of claim 1, wherein the target mapping device is configured to newly recognize an obstacle mapped to the target using a set of instructions executed by an edge-based detector and to output boundary information.

6. The interactive autonomous driving system of claim 1, wherein the target attribute determination device is configured to determine at least one target attribute of a type of the obstacle, a road type, or an obstacle position based on the obstacle information.

7. The interactive autonomous driving system of claim 1, wherein the control mode recommendation information generated by the processor is pre-defined based on the target attribute.

8. The interactive autonomous driving system of claim 1, wherein the processor is configured to output a boundary indication of the obstacle, a touch sound, and a vibration driving command as processing information.

9. The interactive autonomous driving system of claim 1, wherein the processor is configured to output a boundary indication of the obstacle, a touch sound, and a vibration driving command as negative feedback information when there is no obstacle or when the obstacle does not correspond to any pre-defined target attributes.

10. The interactive autonomous driving system of claim 1, wherein the processor is configured to exclude a non-driving path including at least one of a center lane, a shoulder, a guard rail or an obstacle from the control mode recommendation information and configured to deactivate the non-driving path.

11. The interactive autonomous driving system of claim 1, wherein the processor is configured to output processing information including at least one of negative feedback information or control failure feedback information.

12. The interactive autonomous driving system of claim 1, further comprising:
   a sensor device configured to sense at least one of a lane, the obstacle or surrounding environment information and to output the sensing information to the target mapping device;
   a passenger interface device configured to:
     receive target selection information and the control mode selection information from the passenger,
     receive processing information from the processor and perform display to enable recognition of the passenger; and
   an autonomous driving controller configured to perform a temporary control mission during autonomous driving of a vehicle in response to the target attribute information and the selected control mode.

13. The interactive autonomous driving system of claim 12, wherein the passenger interface device is configured to receive from the passenger at least one of initial position information, selection information indicating whether to follow or avoid a target or the control mode selection information.

14. The interactive autonomous driving system of claim 12, wherein the passenger interface device is configured to receive the selection information using a touch screen and to determine an input of the target by recognizing a specific situation.

15. The interactive autonomous driving system of claim 14, wherein the passenger interface device is configured to recognize a point at which a target on the touch screen is touched continuously for a predetermined time or more as the specific situation.

16. The interactive autonomous driving system of claim 14, wherein the passenger interface device is configured to recognize a point at which the touch screen is double-touched as the specific situation.

17. The interactive autonomous driving system of claim 12, wherein the passenger interface device is configured to receive the control mode selection information through a touch sliding on a touch screen after the selection information of the target is received through the touch screen.

18. The interactive autonomous driving system of claim 12, wherein the passenger interface device is implemented with a smartphone possessed by at least one passenger in the vehicle.

19. The interactive autonomous driving system of claim 12, wherein the autonomous driving controller is configured to output control failure feedback information to the processor when the temporary control mission fails.

* * * * *